US012718550B2

(12) United States Patent
Hirai et al.

(10) Patent No.: US 12,718,550 B2
(45) Date of Patent: Aug. 25, 2026

(54) MODEL SELECTION METHOD AND IMAGE PROCESSING METHOD

(71) Applicant: SCREEN Holdings Co., Ltd., Kyoto (JP)

(72) Inventors: Maki Hirai, Kyoto (JP); Shogo Tokisue, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 203 days.

(21) Appl. No.: 18/840,204

(22) PCT Filed: Dec. 6, 2022

(86) PCT No.: PCT/JP2022/044930
§ 371 (c)(1),
(2) Date: Aug. 21, 2024

(87) PCT Pub. No.: WO2023/162394
PCT Pub. Date: Aug. 31, 2023

(65) Prior Publication Data

US 2025/0166372 A1 May 22, 2025

(30) Foreign Application Priority Data

Feb. 25, 2022 (JP) ................................ 2022-027505

(51) Int. Cl.
*G06K 9/00* (2022.01)
*G06V 10/96* (2022.01)
*G06V 20/69* (2022.01)

(52) U.S. Cl.
CPC ............ *G06V 10/96* (2022.01); *G06V 20/695* (2022.01)

(58) Field of Classification Search
CPC ...... G06V 10/96; G06V 20/695; G06V 10/82; G06N 3/04; G06N 3/045; G06N 3/0464;
(Continued)

(56) References Cited

U.S. PATENT DOCUMENTS 11,887,276 B2 * 1/2024 Zu ............................ G06T 1/20
2018/0129918 A1 5/2018 Wang et al.
(Continued)

FOREIGN PATENT DOCUMENTS

CN 107169955 A 9/2017
CN 107967447 A * 4/2018 ............ G06V 20/20
(Continued)

OTHER PUBLICATIONS

International Search Report received in PCT Application No. PCT/JP2022/044930 dated Feb. 28, 2023, w/ English Translation.
(Continued)

*Primary Examiner* — Xin Jia
(74) *Attorney, Agent, or Firm* — RIMON P.C.

(57) ABSTRACT

A model selection method includes a first model selection process and a second model selection process. The first model selection process selects, from among all machine learning models, machine learning models as a first model group by using a first image group that includes at least one confirmation image. The second model selection process selects at least one machine learning model from among the machine learning models included in first model group, by using a second image group. The number of the confirmation images included in the second image group is larger than the number of the confirmation images included in the first image group. By increasing the number of confirmation images in stages and narrowing down the number of models targeted for selection, it is possible to accurately select an appropriate machine learning model from among a large number of machine learning models without using Ground Truth.

8 Claims, 10 Drawing Sheets

(58) Field of Classification Search
CPC ............ G06N 3/08; G06N 3/084; G06N 3/09; G06N 3/0985; G06N 5/01; G06N 20/00; G06N 20/10; G06N 20/20; G06T 2207/10056; G06T 2207/20081; G06T 2207/20084; G06T 2207/30024; G06T 7/11
See application file for complete search history.

(56) References Cited

U.S. PATENT DOCUMENTS

| | | | |
|---|---|---|---|
| 2020/0184269 | A1 | 6/2020 | Sakai et al. |
| 2020/0342597 | A1 | 10/2020 | Chukka et al. |
| 2021/0158525 | A1 | 5/2021 | Iwase et al. |
| 2022/0252857 | A1 | 8/2022 | Mori et al. |

FOREIGN PATENT DOCUMENTS

| | | | | | |
|---|---|---|---|---|---|
| CN | 110245662 | A | * | 9/2019 | ............... G06T 7/11 |
| CN | 111310912 | A | | 6/2020 | |
| CN | 111353822 | A | * | 6/2020 | ............. G06T 11/10 |
| JP | 2021-506022 | A | | 2/2021 | |
| KR | 20220001162 | A | * | 1/2022 | ........... A61B 5/7267 |
| TW | 1689944 | B | | 4/2020 | |
| WO | 2015/177268 | A1 | | 11/2015 | |
| WO | 2019/108695 | A1 | | 6/2019 | |
| WO | 2021/095256 | A1 | | 5/2021 | |

OTHER PUBLICATIONS

Office Action received in Taiwanese Application No. 111147891 dated Aug. 8, 2023.

Extended European Search Report issued in the corresponding European Patent Application No. 22928911.1, dated Jan. 20, 2026.

Felix Mohr, et al.: "Fast and Informative Model Selection Using Learning Curve Cross-Validation", IEEE Transactions on Pattern Analysis and Machine Intelligence, vol. 45, No. 8, Nov. 27, 2021 (Nov. 27, 2021), pp. 9669-9680 (1-8).

Weipeng Zhou, et al.: "Parameter Sensitivity Analysis for the Progressive Sampling-Based Bayesian Optimization Method for Automated Machine Learning Model Selection", Springer, Mar. 4, 2021 (Mar. 4, 2021), pp. 213-227.

Chen Haoran, et al: "Evaluation of cell segmentation methods without reference segmentations", bioRxiv, Sep. 19, 2021 (Sep. 19, 2021), Retrieved from the Internet: URL:https://www.biorxiv.org/content/10.1101/2021.09.17.460800v1.full.

* cited by examiner

MODEL SELECTION METHOD AND IMAGE PROCESSING METHOD

CROSS-REFERENCE TO RELATED APPLICATIONS

This application is the U.S. National Phase under 35 U.S.C. § 371 of International Patent Application No. PCT/JP2022/044930, filed on Dec. 6, 2022, which claims the benefits of Japanese Patent Application No. 2022-027505, filed on Feb. 25, 2022, the entire contents of which are hereby incorporated by reference.

TECHNICAL FIELD

The present invention relates to a model selection method of selecting an appropriate model from a plurality of machine learning models for performing image processing, and an image processing method using the selected machine learning model.

BACKGROUND ART

There is conventionally known to be a method of observing a specimen such as a histopathological sample or cultured cells by staining. At this time, it is important to extract cell regions from an image of a specimen such as a histopathological sample. In particular, more accurate identification of regions of individual cells become necessary in order to perform single-cell analysis of the expression level of biological materials such as proteins on a stained histopathological sample within a digital image. For example, Patent Literature (PTL) 1 discloses a conventional image processing method of extracting cell regions.

CITATION LIST

Patent Literature

PTL 1: Japanese Unexamined Patent Application Publication (Translation of PCT Application) No. 2021-506022

SUMMARY OF INVENTION

Technical Problem

However, in such sample observation, different observation methods, different types of cells, different sampling sites of samples, and different types of stain materials may be used, and even if the same observation method, the same type of cells, the same sampling site of samples, and the same type of stain materials are used, tissue conditions or staining situations may differ. It is thus difficult to identify cell regions by rule-based image processing. Even in the case of using machine learning models, it is not always possible for machine learning models that are capable of accurately extracting cell regions from a certain specimen to accurately extract cell regions from the other samples.

In the case of identifying cell regions by deep learning, by way of example, a method is used in which a model is trained to segment and output cell regions within an unknown image, by using images including cell regions that are annotated by the application of segmentation tasks.

As a technique for selecting an excellent model from among a large number of created machine learning models, information on numerical precision such as F-values or recall ratios is often used when there are correct label images (Ground Truth). However, manually creating correct Ground Truth takes time and therefore it is inefficient to create Ground Truth for model evaluation for each target for analysis. Besides, in the case where completed Ground Truth is present, there is no need to identify cell regions by using machine learning models, so that ordinarily Ground Truth is not present at the time of analysis.

The present invention has been made in light of such circumstances, and it is an object of the present invention to provide a technique for selecting a machine learning model from among a large number of machine learning models with high accuracy and efficiency without using Ground Truth.

Solution to Problem

To solve the problem described above, a first aspect of the present application is a model selection method of selecting at least one machine learning model from among a plurality of machine learning models by using a plurality of confirmation images, the plurality of machine learning models being for performing image processing. The model selection method includes a) a first model selection process of selecting, from among all of the plurality of machine learning models that are included in a total model group, a plurality of machine learning models as a first model group by using a first image group that includes at least one confirmation image among the plurality of confirmation images, and b) a second model selection process of selecting at least one machine learning model as a second model group from among the plurality of machine learning models included in the first model group, by using a second image group that includes a plurality of confirmation images among the plurality of confirmation images. The second model selection process b) is performed after the first model selection process a). The number of the plurality of confirmation images included in the second image group is larger than the number of the at least one confirmation image included in the first image group.

A second aspect of the present application is the model selection method according to the first aspect, in which the first model selection process a) includes a1) obtaining output results by inputting all of the at least one confirmation image included in the first image group to all of the plurality of machine learning models included in the total model group, a2) displaying the output results obtained in the operation a1), and a3) receiving input of a selection result from an outside source, the selection result being obtained by selecting some of the plurality of machine learning models included in the total model group.

A third aspect of the present application is the model selection method according to the first or second aspect, in which the second model selection process b) includes b1) obtaining output results by inputting all of the plurality of confirmation images included in the second image group to all of the plurality of machine learning models included in the first model group, b2) displaying the output results obtained in the operation b1), and b3) receiving input of a selection result from an outside source, the selection result being obtained by selecting some of the plurality of machine learning models included in the first model group.

A fourth aspect of the present application is the model selection method according to any one of the first to third aspects, in which the at least one machine learning model included in the second model group includes a plurality of machine learning models. The model selection method further includes c) a third model selection process of selecting one machine learning model from among the plurality of machine learning models included in the second model group, by using a third image group that includes a plurality of confirmation images among the plurality of confirmation images. The third model selection process c) is performed after the second model selection process b). The number of the plurality of confirmation images included in the third image group is larger than the number of the plurality of confirmation images included in the second image group.

A fifth aspect of the present application is the model selection method according to any one of the first to fourth aspects that further includes d) a first image selection process of selecting one or a plurality of confirmation images as the first image group from among all of the plurality of confirmation images, the first image selection process d) being performed before the first model selection process a), and e) a second image selection process of selecting a plurality of confirmation images as the second image group from among all of the plurality of confirmation images, the second image selection process e) being performed before the second model selection process b).

A sixth aspect of the present application is the model selection method according to the fifth aspect, in which the first image selectin process d) includes d1) obtaining output results by inputting all of the plurality of confirmation images to all of the plurality of machine learning models included in the total model group, d2) calculating variation among the output results obtained in the operation d1) for each of the plurality of confirmation images, and d3) selecting a confirmation image that has great variation calculated in the operation d2) as the first image group from among all of the plurality of confirmation images.

A seventh aspect of the present application is the model selection method according to any one of the first to sixth aspects, in which the plurality of machine learning models perform image processing for recognizing and segmenting a cell region within an image that includes a cell.

An eighth aspect of the present application is an image processing method of performing image processing on a plurality of analysis images by using a machine learning model. The image processing method includes s) selecting one machine learning model by the model selection method according to any one of claims 1 to 7, and t) performing image processing on the plurality of analysis images by using the one machine learning model selected in the operation s). The plurality of confirmation images used in the operation s) are the plurality of analysis images that are processed in the operation t).

Advantageous Effects of Invention

According to the first to eighth aspects of the present application, firstly the first model selection process uses a small number of confirmation images to roughly select a large number of machine learning models, and then the second model selection process uses a larger number of confirmation images to further select a machine learning model. By increasing the number of confirmation images in stages and narrowing down the number of machine learning models targeted for selection, it is possible to accurately select an appropriate machine learning model while minimizing the number of output results of the machine learning models that are to be checked in selecting a machine learning model. Accordingly, it is possible to select a machine learning model from among a large number of machine learning models with high accuracy and efficiency without using Ground Truth.

In particular, according to the second aspect of the present application, the first model selection process may be performed according to the judgment of the user who has checked the output results of the machine learning models. This allows appropriate selection of the first model group.

In particular, according to the third aspect of the present application, the second model selection process may be performed according to the judgment of the user who has checked the output results of the machine learning models. This allows appropriate selection of the second model group.

In particular, according to the fourth aspect of the present application, the machine learning model is selected in three steps including the first model selection process, the second model selection process, and the third model selection process. Accordingly, when there are a large number of machine learning models targeted for selection, it is possible to select an appropriate machine learning model more accurately than in the case where the machine learning model is selected in two steps.

In particular, according to the fifth aspect of the present application, the confirmation images used in the first model selection process and the confirmation images used in the second model selection process are selected from among a large number of confirmation images. This allows more accurate selection of a machine learning model.

In particular, according to the sixth aspect of the present application, the first model selection process uses confirmation images that are likely to have variation among output results of the machine learning models targeted for selection. Accordingly, even if a smaller number of confirmation images are used for selection, it is possible to accurately select a machine learning model.

In particular, according to the seventh aspect of the present application, the input images of the machine learning models may vary greatly depending on cell type, reagent type, or observation environments. Thus, it is important to select an appropriate machine learning model.

In particular, according to the eighth aspect of present application, the machine learning model is selected by using the analysis images targeted for analysis. Accordingly, it is possible to select an optimum machine learning model for the analysis images.

DESCRIPTION OF EMBODIMENT

Hereinafter, embodiments of the present invention will be described with reference to the drawings.

1. First Embodiment

1-1. Configuration of Image Analyzer

Figure 1:
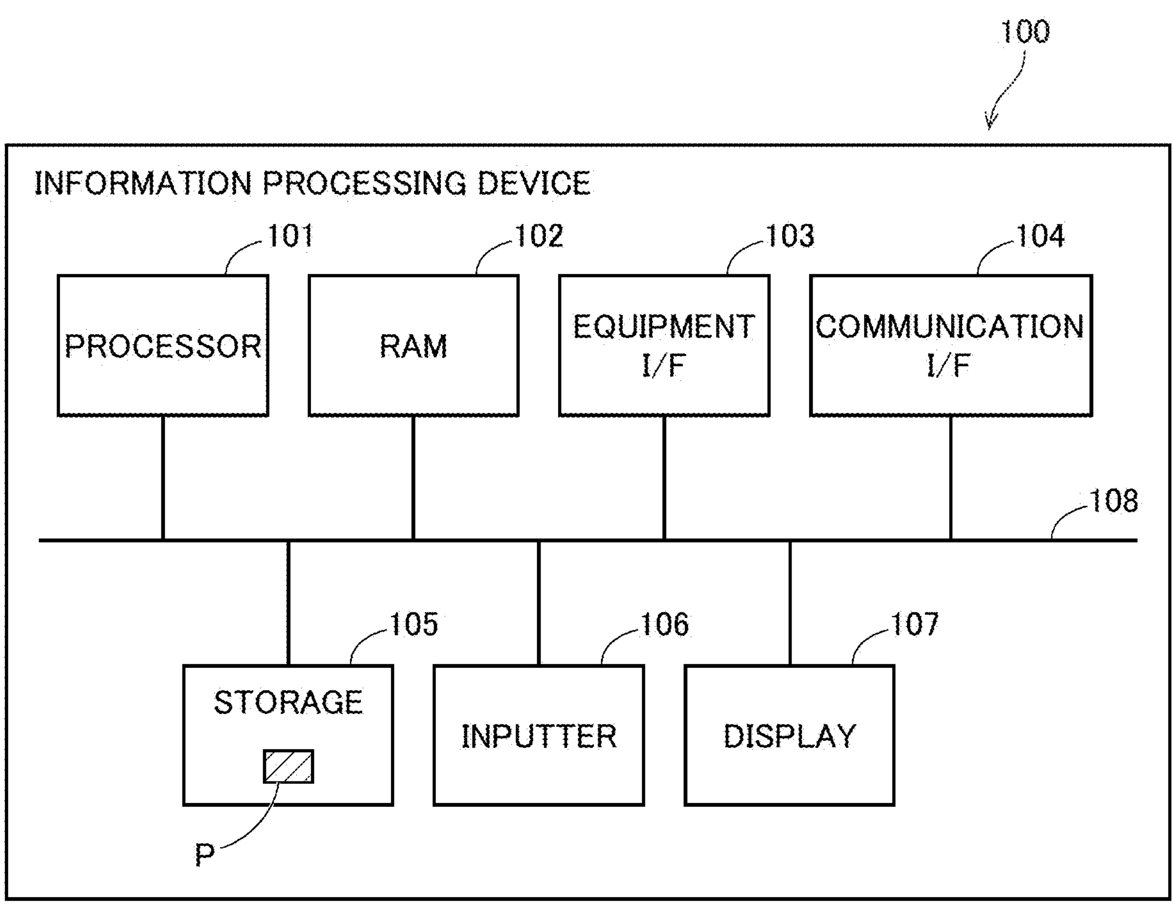
FIG. 1 illustrates a hardware configuration of an information processing device according to a first embodiment.

FIG. 1 illustrates a hardware configuration of an information processing device 100 that achieves an image analysis device 20 including a machine-learning-model selection apparatus 1 according to a first embodiment.

As shown in FIG. 1, the information processing device 100 is configured as a computer. Specifically, the information processing device 100 includes a processor 101, RAM 102, a device interface (I/F) 103, a communication I/F 104, a storage 105, an inputter 106, and a display 107. The processor 101, the RAM 102, the device I/F 103, the communication I/F 104, the storage 105, the inputter 106, and the display 107 are electrically connected to one another via a bus 108.

Specifically, the processor 101 incudes a CPU or a GPU. The RAM 102 is an information readable and writable recording medium, and specifically may be SDRAM.

The device I/F 103 is an interface for electrically connecting external equipment such as an image capture device 9 described later to the information processing device 100. The communication I/F 104 is an interface for connecting the information processing device 100 to a network such as the Internet. The external equipment such as the image capture device 9 may be connected to the information processing device 100 via the communication I/F 104.

The storage 105 is an information readable and writable recording medium, and specifically may include a hard disk drive (HDD) or a solid-state drive (SSD). Note that the storage 105 may include other components such as an optical disk having portability, a magnetic disk, or semiconductor memory. The storage 105 stores a program P. Using the RAM 102 as a work area, the processor 101 executes the program P to achieve various functions of the image analysis device 20 and the machine-learning-model selection apparatus 1. Alternatively, the program P may be provided in or distributed to the information processing device 100 via the network.

The inputter 106 is an input device that accepts operational input from the user. Specifically, the inputter 106 may, for example, be a mouse or a keyboard. The display 107 is a display device that displays images that represent various types of information. Specifically, the display 107 may be a liquid crystal display. Note that the inputter 106 and the display 107 may form a simplex device such as a touch panel display.

Figure 2:
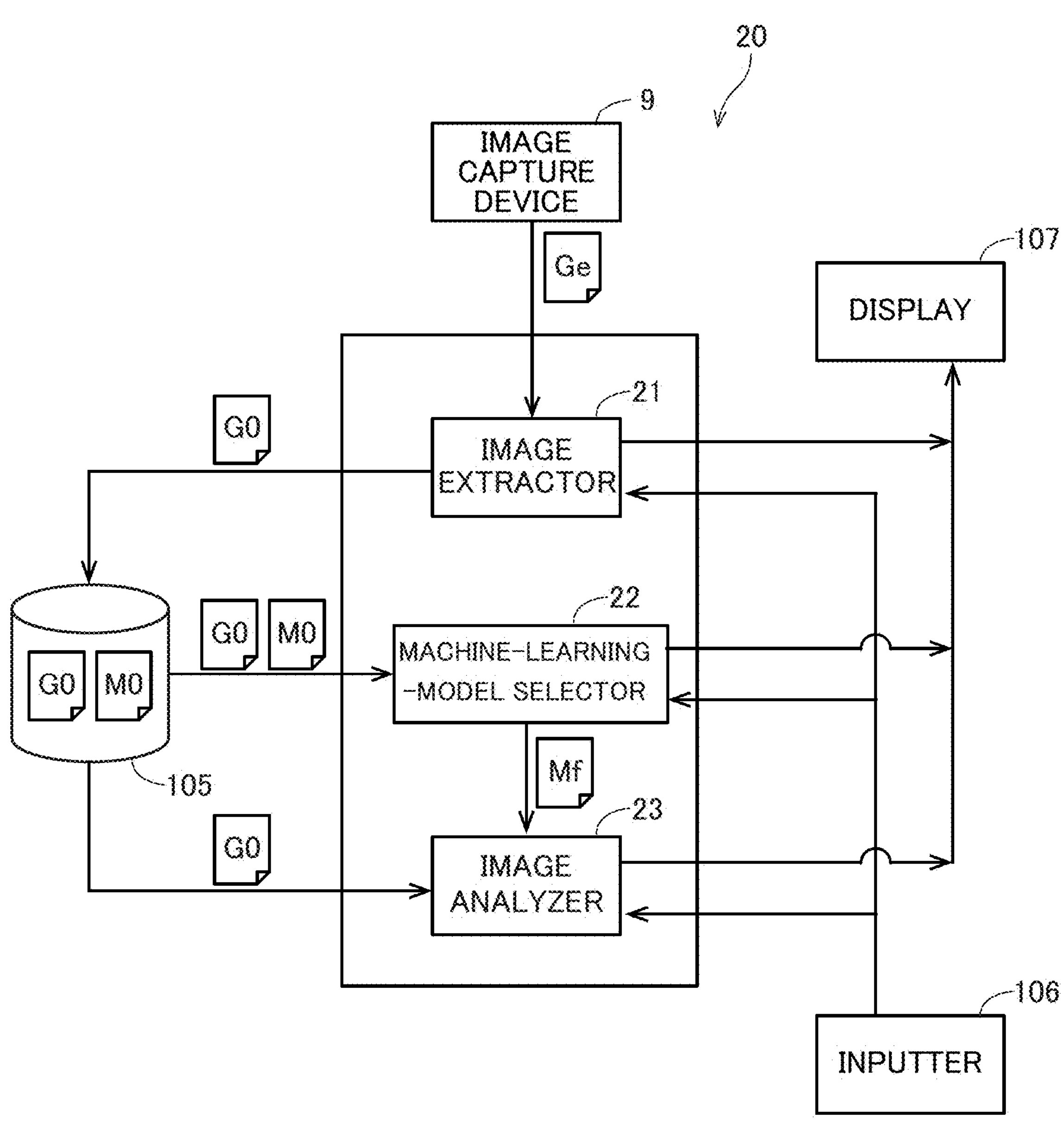
FIG. 2 illustrates a functional configuration of an image analyzer according to the first embodiment.

FIG. 2 illustrates a functional configuration of the image analysis device 20 achieved by the information processing device 100 according to the first embodiment. The image analysis device 20 is a device for analyzing images that are input from external equipment. The image analysis device 20 according to the present embodiment is a device for analyzing cell images that are input from the image capture device 9 provided in a microscope. The image analysis device 20 includes an image extractor 21, a machine-learning-model selector 22, and an image analyzer 23. The image extractor 21, the machine-learning-model selector 22, and the image analyzer 23 are functions achieved by the processor 101 operating in accordance with the program P.

The image extractor 21 obtains a plurality of images for analysis from an input image Ge that is input from the image capture device. In the present embodiment, the image capture device 9 is a camera provided in the microscope, and the input image Ge is an image obtained by capturing a fluorescent-stained tissue sample by the image capture device 9 provided in the microscope. In the present embodiment, targets for analysis are tissue samples stained with fluorescent stains, but the present invention is not limited thereto. The targets for analysis can be any captured images of specimens that require segmentation. The targets for analysis are not limited to tissue samples and may be any other biological specimens such as cultured cells or blood cells. The targets for analysis are also not limited to specimens stained with fluorescent stains, and may be other specimens such as unstained specimens or specimens stained with non-fluorescent stains.

The image extractor 21 extracts a plurality of narrow-field images from the input image Ge captured in a wide field of view to acquire a plurality of analysis images. The extracted analysis images are stored as a total image group G0 in the storage 105.

In the present embodiment, the image extractor 21 causes the display 107 to display the wide-field input image Ge. Then, the user designates a plurality of areas from the input image Ge by operating the inputter 106. The image extractor 21 extracts the designated areas as narrow-field analysis images. Note that the image extractor 21 may extract these analysis images by an automated procedure without using the above procedure. In that case, for example, the input image Ge may be extracted in a tile shape of a predetermined size by an automated procedure.

The machine-learning-model selector 22 selects one machine learning model from among a plurality of machine learning models for performing image processing, by using a plurality of confirmation images. Specifically, the total image group G0 stored in the storage 105 and a total model group M0 that includes a plurality of machine learning models are read out, and the total image group G0 is used to select and output one machine learning model as a selected model Mf from the total model group M0. In the present embodiment, each machine learning model is configured to, upon receiving input of an observation image of fluorescent-stained cells, identify and output a cell region of each cell in the observation image.

In the present embodiment, the analysis images that are actually targeted for image analysis are used as confirmation images for use in selecting a machine learning model. That is, a plurality of analysis images included in the total image group G0 acquired by the image extractor 21 are used as the confirmation images. A detailed structure of the machine-learning-model selector 22 will be described later.

The image analyzer 23 analyzes the analysis images through image processing. In the present embodiment, for each of the analysis images extracted by the image extractor 21, the image analyzer 23 identifies cell regions by using the selected model Mf selected by the machine-learning-model selector 22. Thereafter, the areas and distributions of stained regions in the identified cell regions are calculated for each stain type.

1-2. Configuration of Machine-Learning-Model Selection Apparatus

Figure 3:
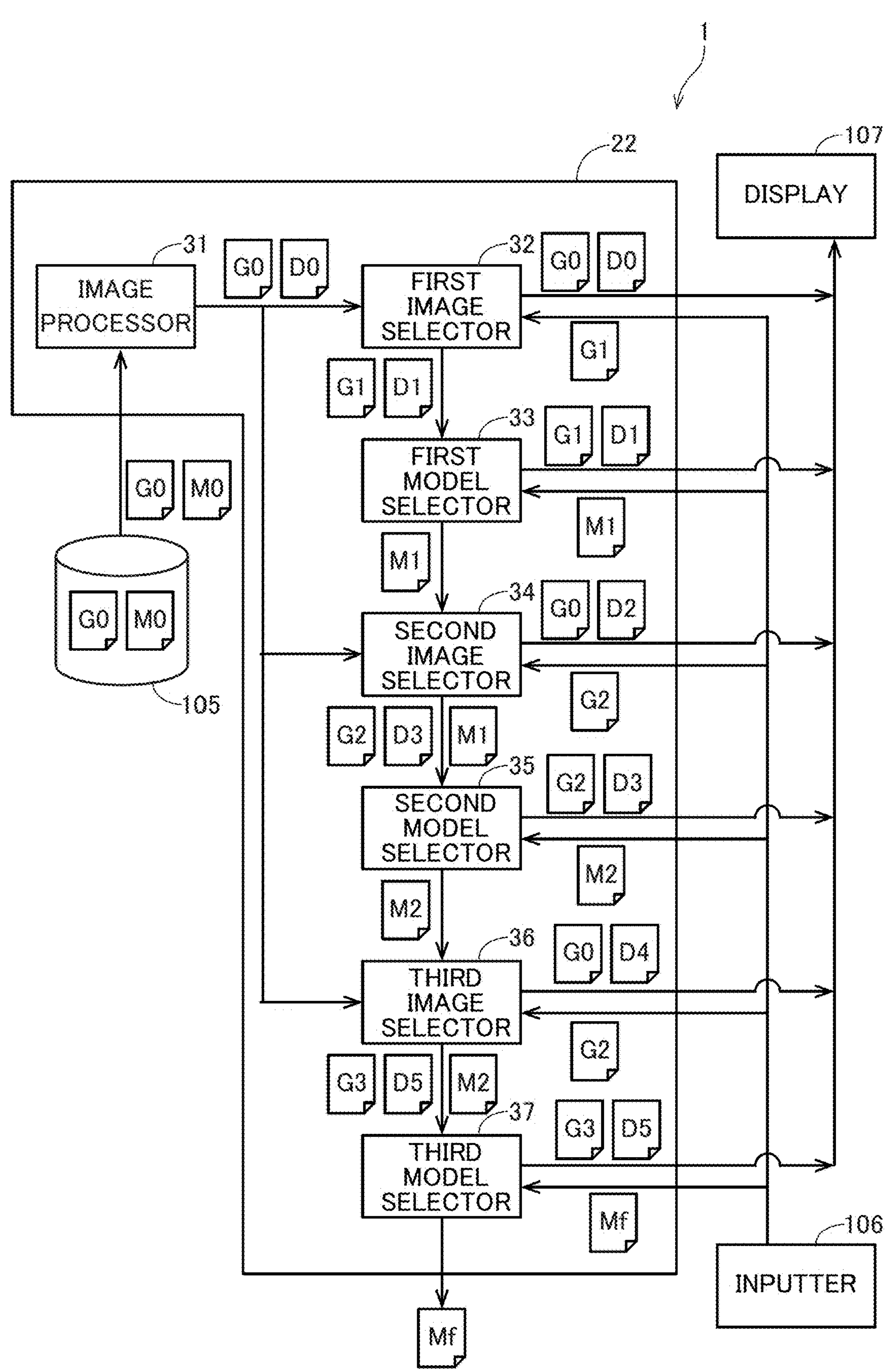
FIG. 3 illustrates a functional configuration of a machine-learning-model selection apparatus according to the first embodiment.

Next, the machine-learning-model selection apparatus 1 will be described with reference to FIG. 3. FIG. 3 illustrates a functional configuration of the machine-learning-model selection apparatus 1 achieved by the information processing device 100 according to the first embodiment. The machine-learning-model selection apparatus 1 selects one machine learning model from among a plurality of machine learning models for performing image processing, by using a plurality of confirmation images.

As described previously, the machine-learning-model selection apparatus 1 selects a machine learning model that performs image processing for recognizing and segmenting cell regions within images that include cells. The images that include cells may be viewed differently depending on, for example, a difference in image capture conditions, the presence or absence of staining, or a difference in stain. Thus, each image has a different optimum machine learning model for identifying cell regions. It is thus preferable that the machine-learning-model selection apparatus 1 may be used to select an optimum machine learning model every time the target for analysis is changed.

To facilitate understanding, a specific example will be described below with reference to a specific number of confirmation images and a specific number of machine learning models, in which one machine learning model is selected from among 100 machine learning models by repeatedly performing the image selection process and the model selection process three times by using 80 confirmation images. The number of confirmation images and the number of machine learning models targeted for selection are however not limited to the above example, and there are no particular limitations on number of confirmation images and the number of machine learning models targeted for selection as long as those numbers are plural.

The machine-learning-model selection apparatus 1 includes the aforementioned machine-learning-model selector 22. As shown in FIG. 3, the machine-learning-model selector 22 includes an image processor 31, a first image selector 32, a first model selector 33, a second image selector 34, a second model selector 35, a third image selector 36, and a third model selector 37. The image processor 31, the first image selector 32, the first model selector 33, the second image selector 34, the second model selector 35, the third image selector 36, and the third model selector 37 are functions achieved by the processor 101 operating in accordance with the program P. The machine-learning-model selection apparatus 1 further includes the storage 105, the inputter 106, and the display 107, which are described above.

The storage 105 stores the total image group G0 and the total model group M0. The total image group G0 includes a plurality of confirmation images g1 to g80. In the present embodiment, the confirmation images g1 to g80 included in the total image group G0 are analysis images that are actually used for analysis. The total model group M0 includes a plurality of machine learning models. These machine learning models may include those that are created by the same type of algorithm using different parameters, or may include those that are created by various types of algorithms.

The image processor 31 inputs all of the confirmation images included in the total image group G0 to all of the machine learning models included in the total model group M0 so as to obtain a total output result group DO. The image processor 31 transfers the total image group G0 and the total output result group DO to the first image selector 32, the second image selector 34, and the third image selector 36. For example, the total output result group DO may include 8000 output results in total, which are obtained by inputting all of the 80 confirmation images to all of the 100 machine learning models.

The first image selector 32 selects one or a plurality of images as a first image group G1 from among all of the confirmation images included in the total image group G0. Then, the first image selector 32 transfers, to the first model selector 33, the first image group G1 and a first output result group D1 that includes output results obtained by inputting the first image group G1 to each of the machine learning models included in the total model group M0. The first output result group D1 includes all output results that are obtained from the total output result group DO by inputting the confirmation images included in the first image group G1 to all of the machine learning models included in the total model group M0. For example, in the case where the first image group G1 includes two confirmation images and the total model group M0 includes 100 machine learning models, the first output result group D1 includes 200 output results.

The first model selector 33 selects a plurality of machine learning models as a first model group M1 from among the machine learning models included in the total model group M0 by using the first image group G1 and the first output result group D1 that includes the output results obtained from the first image group G1 and the total model group M0. The number of machine learning models included in the first model group M1 is smaller than the number of machine learning models included in the total model group M0. The first model selector 33 transfers the selected first model group M1 to the second image selector 34.

The second image selector 34 selects a plurality of images as a second image group G2 from among all of the confirmation images included in the total image group G0. In the present embodiment, the second image selector 34 selects and determines a plurality of confirmation images as the second image group G2 by using a second output result group D2 that includes output results obtained from the total image group G0 and the first model group M1. For example, in the case where the total image group G0 includes 80 confirmation images and the first model group M1 includes 30 machine learning models, the second output result group D2 includes 2400 output results.

Then, the second image selector 34 transfers, to the second model selector 35, the second image group G2, the first model group M1, and a third output result group D3 that includes output results obtained from the second image group G2 and the first model group M1. The number of confirmation images included in the second image group G2 is larger than the number of confirmation images included in the first image group G1. Note that the second image group G2 may include all or only some of the confirmation images included in the first image group G1, or may include none of them. For example, in the case where the second image group G2 includes five confirmation images and the first model group M1 includes 30 machine learning models, the third output result group D3 includes 150 output results.

The second model selector 35 selects a plurality of machine learning models as a second model group M2 from among the machine learning models included in the first model group M1 by using the second image group G2 and the third output result group D3 that includes the output results obtained from the second image group G2 and the first model group M1. The number of machine learning models included in the second model group M2 is smaller than the number of machine learning models included in the first model group M1. The second model selector 35 transfers the selected second model group M2 to the third image selector 36.

The third image selector 36 selects a plurality of images as a third image group G3 from among all of the confirmation images included in the total image group G0. In the present embodiment, the third image selector 36 selects and determines a plurality of confirmation images as the third image group G3 by using a fourth output result group D4 that includes output results obtained from the total image group G0 and the second model group M2. For example, in the case where the total image group G0 includes 80 confirmation images and the second model group M2 includes five machine learning models, the fourth output result group D4 includes 400 output results.

Then, the third image selector 36 transfers, to the third model selector 37, the third image group G3, the second model group M2, and a fifth output result group D5 that includes output results obtained from the third image group G3 and the second model group M2. The number of confirmation images included in the third image group G3 is larger than the number of confirmation images included in the second image group G2. Note that the third image group G3 may include all or only some of the confirmation images included in the first image group G1 and the second image group G2, or may include none of them. For example, in the case where the third image group G3 includes 40 confirmation images and the second model group M2 includes five machine learning models, the fifth output result group D5 includes 200 output results.

Alternatively, the third image selector 36 may determine all of the confirmation images included in the total image group G0 as the third image group G3. For example, in the case where the number of all of the confirmation images included in the total image group G0 is less than or equal to a predetermined threshold value, all of the confirmation images included in the total image group G0 may be determined as the third image group G3. As another alternative, the third image selector 36 may select confirmation images as the third image group G3 at random from among the confirmation images included in the total image group G0.

The third model selector 37 selects one of the machine learning models included in the second model group M2 as a selected model Mf by using the third image group G3 and the fifth output result group D5 that includes the output results obtained from the third image group G3 and the second model group M2.

1-3. Procedure for Image Processing

Figure 4:
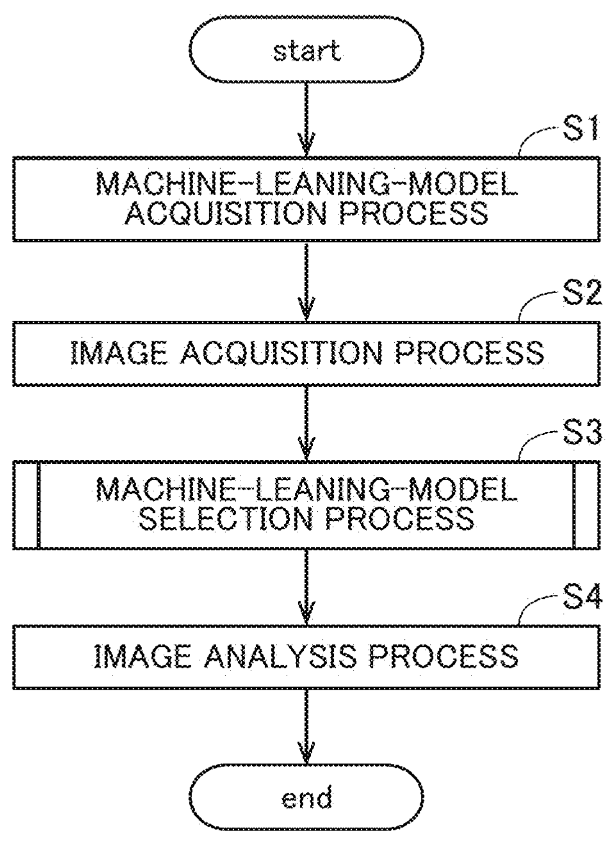
FIG. 4 is a flowchart showing a procedure for an image analysis process.

Next, a procedure for an image analysis process including the model selection process will be described with reference to FIG. 4. FIG. 4 is a flowchart showing the procedure for the image analysis process.

The image analysis device 20 firstly acquires machine learning models targeted for selection (step S1: machine learning model acquisition process). In the present embodiment, 100 machine learning models are acquired. Specifically, 100 machine learning models serving as candidates are stored in the storage 105. These machine learning models may include those that are created by the same algorithm using different parameters, or may include those that are created by a plurality of types of algorithms, as long as those machine learning models are those that perform image processing for the same purpose.

Then, a plurality of images serving as confirmation images are acquired (step S2: image acquisition process). In the present embodiment, as described previously, the image extractor 21 acquires a plurality of analysis images as the confirmation images by extracting the input image Ge that is input from the image capture device 9. That is, the confirmation images are observation images of tissue samples that are targeted for image analysis in the image analysis process described later. In the present embodiment, 80 confirmation images are acquired. The acquired confirmation images are stored in the storage 105.

Then, the machine-learning-model selector 22 selects one machine learning model from among all of the 100 machine learning models by using the confirmation images acquired in the image acquisition process in step S2 (step S3: machine-learning-model selection process). Since the images for image analysis are used as the confirmation images in the present embodiment, an optimum machine learning model is selected for images that are targeted for analysis in the subsequent image analysis process. The details of the machine-learning-model selection process performed in step S3 will be described later.

Ultimately, the image analyzer 23 performs image analysis on the observed images for image analysis (step S4: image analysis process). Specifically, firstly, cell regions within each image for image analysis are identified using the machine learning model selected in the machine-learning-model selection process in step S3. Then, luminance of each stained color and the area of each identified cell region are calculated within the cell region. In this way, it is possible to estimate the expression level and distribution area of biological materials that are visualized by staining.

1-4. Procedure for Machine-Learning-Model Selection Process

Then, the machine-learning-model selection process in step S3 will be described with reference to FIGS. 5 to 10.

Figure 5:
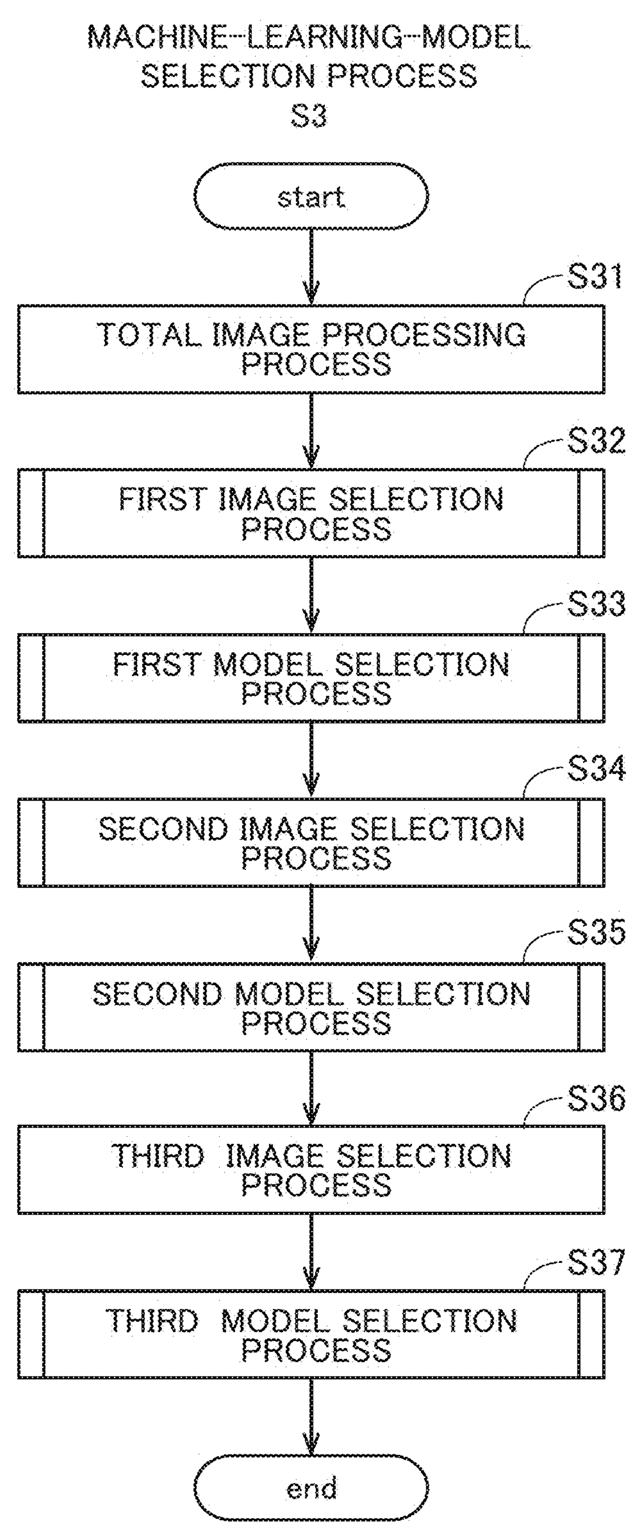
FIG. 5 is a flowchart showing a procedure for a machine-learning-model selection process.

FIG. 5 is a flowchart showing the procedure for the machine-learning-model selection process S3. As shown in FIG. 5, the machine-learning-model selection process according to the present embodiment is to select a machine learning model in stages from among a large number of machine learning models. In the present embodiment, one machine learning model is selected in three steps including a first model selection process S33, a second model selection process S35, and a third model selection process S37 which will be described later. Note that the present invention is not limited to this example, and a two-step model selection process or a four or more step model selection process may be used to select a machine learning model as long as the machine learning model selection process includes a plurality of model selection processes.

Figure 6:
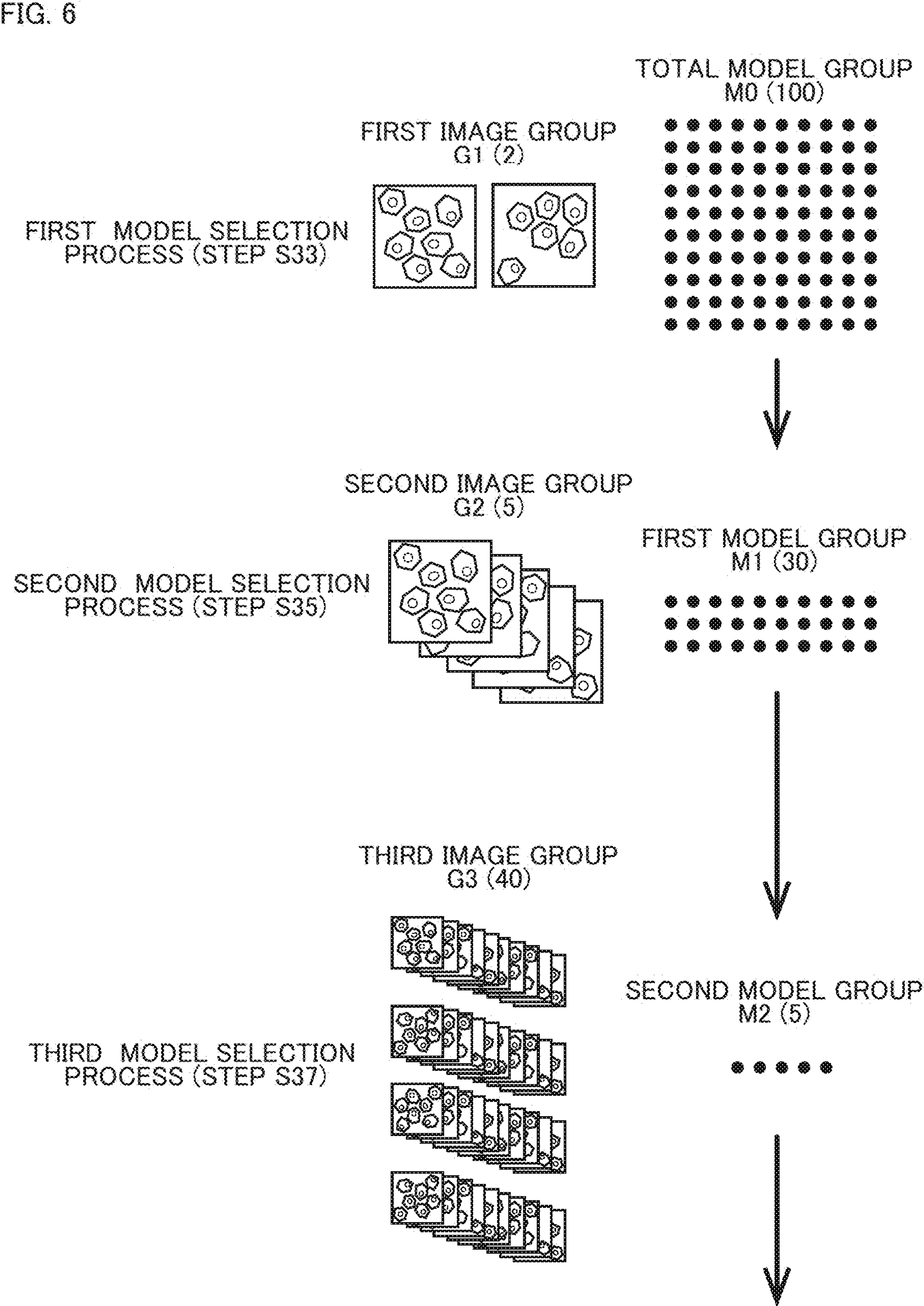
FIG. 6 shows a numerical image of image groups and model groups targeted for selection, which are used in each stage of the machine-learning-model selection process.

FIG. 6 shows a numerical image of image groups and model groups targeted for selection, which are used in each stage of the machine-learning-model selection process S3 according to the present embodiment. In FIG. 6, a numeral in each parentheses given after the name of each image group or each model group indicates the number of images or machine learning models included in the image group or the model group.

Figure 7:
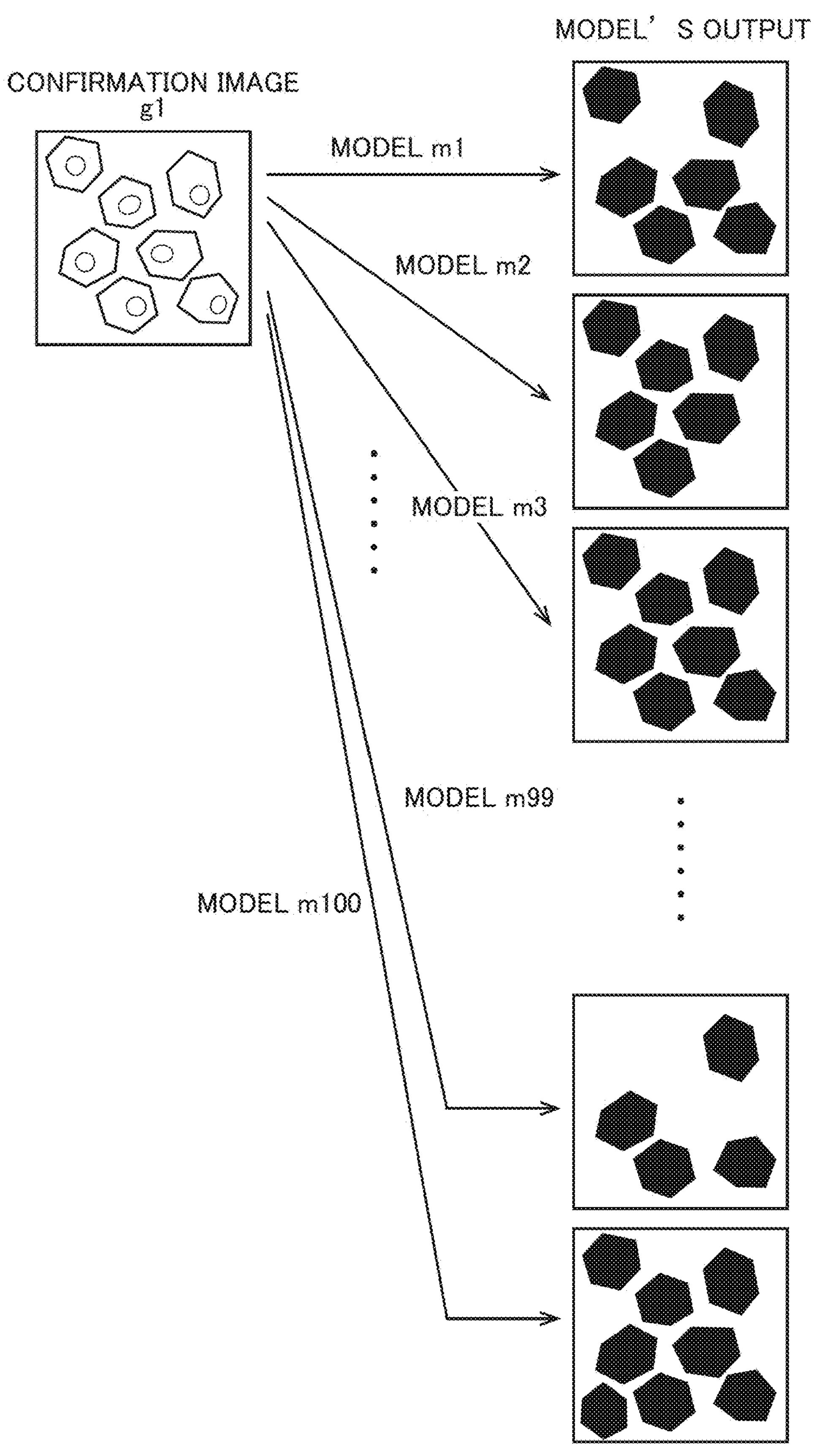
FIG. 7 schematically shows output results obtained by inputting one confirmation image to a plurality of machine learning models.

FIG. 7 schematically illustrates output results obtained by inputting one confirmation image g1 to all machine learning models m1 to m100 included in the total model group M0. As shown in FIG. 7, the confirmation image g1 includes images of cells. Each of the machine learning models m1 to m100 identifies cell regions within the confirmation image g1. In FIG. 7, the identified regions are shown in black.

Machine learning models that are suitable for the confirmation image g1 recognize most of the cells and do not misrecognize regions that do not correspond to cells. On the other hand, machine learning models that are unsuitable for the type of this confirmation image g1 fail to recognize some cells or misrecognize, as cells, regions that do not correspond to cells. In the example shown in FIG. 7, the model m3 has recognized all of the cells, but the models m1, m2, and m99 have failed to recognize some of the cells. Meanwhile, the model m100 has misrecognized, as a cell, a region that does not correspond to a cell.

Based on the output results, in order to select machine learning models that perform most appropriate image processing on all of the confirmation images g1 to g80, for example, it is conceivable for the user to check and analyze the output results from all of the machine learning models m1 to m100 for all of the confirmation images g1 to g80. However, it takes time and effort to check such output results for all of the confirmation images g1 to g80 and all of the machine learning models m1 to m100 in order to use optimum identification results.

In view of this, in the machine-learning-model selection process S3 as shown in FIG. 6, a reduced number of confirmation images is used for model selection in those stages in which there are a large number of machine learning models targeted for selection. Then, the number of machine learning models targeted for selection is reduced in stages and the number of confirmation images is increased in stages in order to check the outputs of the machine learning models. This enables selecting a more appropriate machine learning model while saving efforts in selection.

In the machine-learning-model selection process S3, firstly, the image processor 31 inputs all of the confirmation images included in the total model group M0 to all of the machine learning models included in the total image group G0 to obtain the total output result group D0 (step S31: total image processing process). In the present embodiment, the total output result group D0 includes 8000 output results in total, which are obtained by inputting all of the 80 confirmation images to all of the 100 machine learning models.

Then, the first image selector 32 selects one or a plurality of images as the first image group G1 from among all of the confirmation images included in the total image group G0 (step S32: first image selection process). The first image selection process S32 may be performed manually or automated, or may be partly performed manually and partly automated.

Figure 8:
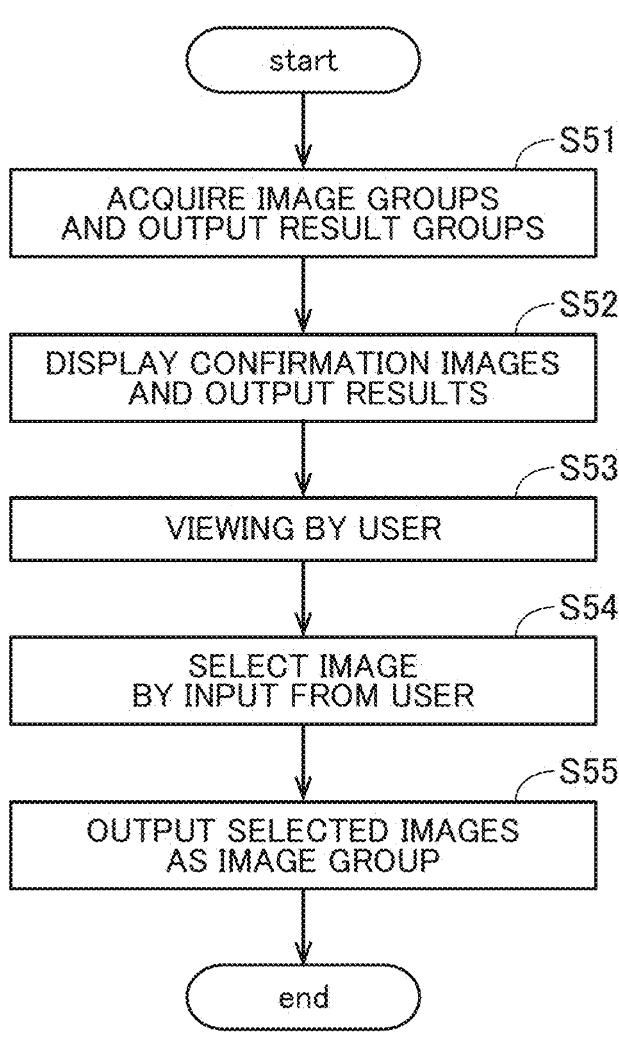
FIG. 8 is a flowchart showing a procedure performed when a first image selection process and a second image selection process are performed manually.

FIG. 8 is a flowchart showing a procedure performed when the first image selection process S32 and the second image selection process S34 are performed manually. As shown in FIG. 8, in the case of manually performing the first image selection process S32, firstly, the first image selector 32 acquires the total image group G0 and the total output result group DO from the image processor 31 (step S51).

Then, the first image selector 32 causes the display 107 to display, for confirmation, the confirmation images included in the total image group G0 and the output results included in the total model group M0 for the confirmation images (step S52). That is, 100 output results are displayed for each of the 80 confirmation images included in the total image group G0.

Then, the user views the display provided in step S52 (step S53). Thereafter, the user selects confirmation images that the user wants to use in the first model selection process S33, and inputs the selected confirmation images to the first image selector 32 via the inputter 106 (step S54).

The first image selector 32 recognizes the confirmation images selected via the inputter 106 as the first image group G1 and transfers, to the first model selector 33, the first image group G1 and the first output result group D1 that includes output results obtained from the first image group G1 and the total model group M0 (step S55). In the present embodiment, the first image group G1 that includes two confirmation images and the first output result group D1 that includes 200 output results obtained from the first image group G1 and the total model group M0 are transferred to the first model selector 33.

Figure 9:
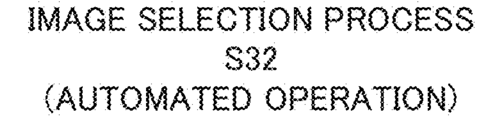
FIG. 9 is a flowchart showing a procedure performed when the first image selection process is automated.
Figure 9:
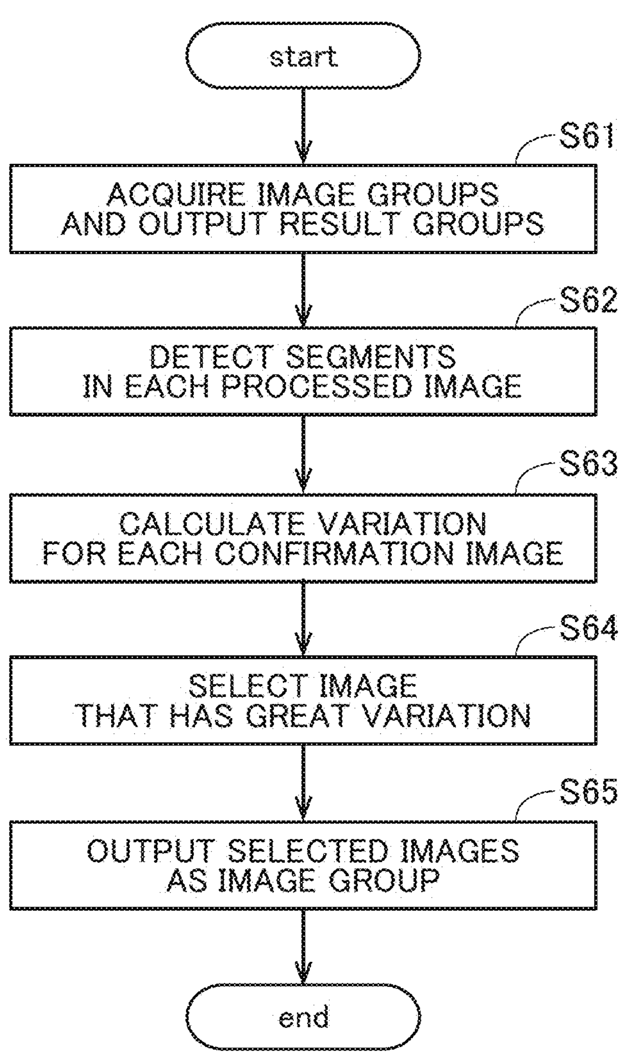

FIG. 9 is a flowchart showing a procedure performed when the first image selection process S32 is automated. As shown in FIG. 9, in the case of automating the first image selection process S32, firstly, the first image selector 32 acquires the total image group G0 and the total output result group DO from the image processor 31 (step S61).

Then, for each of the confirmation images included in the total image group G0, the first image selector 32 detects segments in the output results obtained from the confirmation image. That is, the first image selector 32 detects areas that are identified as cell regions in the output results of the total model group M0 for each confirmation image (step S62).

Then, for each confirmation image, the first image selector 32 calculates variation of the segments among all of the output results (step S63). In the present embodiment, the dispersion of the numbers of segments among the output results is used as a value indicating the variation. Note that the value indicating the variation is not limited thereto, and any indicator may be used that indicates variation in dispersion or standard deviation of various parameters such as the number of segments, the average area, the total area, and the center location. The value indicating the variation is also not limited to one type of value, and may be two or more types of values.

Then, the first image selector 32 selects, as the first image group G1, a confirmation image that has great variation among the models from among all of the 80 confirmation images included in the total image group G0 (step S64). Then, the first image selector 32 transfers, to the first model selector 33, the first image group G1 and the first output result group D1 that includes output results obtained from the first image group G1 and the total model group M0 (step S65).

When the first image selection process in step S32 has ended, the first model selector 33 selects machine learning models from the total model group M0 (step S33: first model selection process). The first model selector 33 selects a plurality of machine learning models as the first model group M1 from among the machine learning models included in the total model group M0 by using the first image group G1 and the first output result group D1 that includes the output results obtained from the first image group G1 and the total model group M0. Then, the first model selector 33 transfers the first model group M1 to the second image selector 34.

Figure 10:
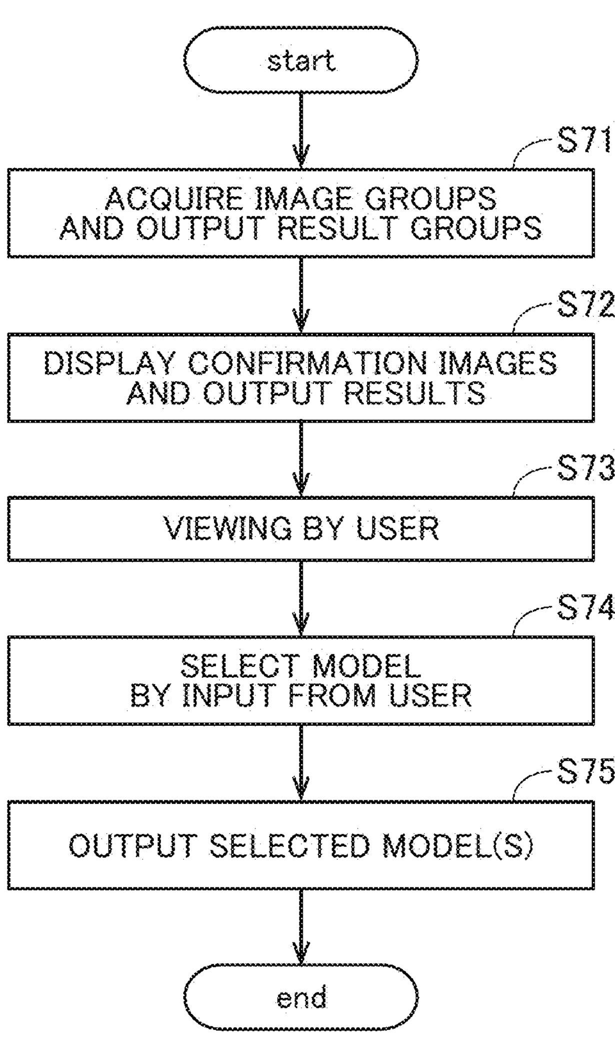
FIG. 10 is a flowchart showing a procedure for first, second, and third model selection processes.

FIG. 10 is a flowchart showing a procedure for the first model selection process S33, the second model selection process S35, and the third model selection process S37.

In the case of performing the first model selection process S33, as shown in FIG. 10, firstly, the first model selector 33 acquires the first image group G1 and the first output result group D1 that includes the output results obtained from the first image group G1 and the total model group M0, which are used for selection (step S71).

Then, the first model selector 33 causes the display 107 to display, for confirmation, each of the confirmation images included in the first image group G1 and the output results of the total model group M0 for the confirmation image (step S72). That is, 100 output results are displayed for each of the two confirmation images included in the first image group G1.

Then, the user views and checks the display provided in step S72 (step S73). Thereafter, the user selects machine learning models that the user has determined as appropriate, and inputs the selected machine learning models to the first model selector 33 via the inputter 106 (step S74). In the present embodiment, 30 machine learning models are selected at this time. The first model selector 33 determines machine learning models from the models of the total model group M0 as the first model group M1, based on the contents of the input, and transfers the first model group M1 to the second image selector 34 (step S75).

Note that the first model selection process S33 may be automated by the processor 101 according to the judgment of the user. For example, the automated selection may be carried out if the number of machine learning models included in the total model group M0 is greater than or equal to a fixed value. Alternatively, for example, the automated selection may be carried out if the first model selector 33 causes the display 107 to display a histogram of the numbers of segments in the output results and the user who views the display requires the automated selection.

In the case of automating the first model selection process S33, when the user inputs a command for automated selection to the inputter 106, the first model selector 33 may select, for example, a predetermined number of machine learning models (in the present embodiment, 30 machine learning models) whose number of segments is close to the average value or mode among the total model group M0 as the first model group M1. Alternatively, the user may view and judge a histogram of the numbers of segments, and determine to include machine learning models whose number of segments is greater than the average value or mode into the first model group M1.

Following the first model selection process S33, the second image selector 34 selects the second image group G2 that are used in the second model selection process S35 (step S34: second image selection process). The number of confirmation images included in the second image group G2 is larger than the number of confirmation images included in the first image group G1.

In the second image selection process S34, a plurality of images are selected as the second image group G2 from among all of the confirmation images included in the total image group G0 by using the second output result group D2 that includes output results obtained from the total image group G0 and the first model group M1. The second image selection process may be performed manually or automated, or may be partly performed manually and partly automated.

In the case of manually performing the second image selection process S34, as shown in FIG. 8, firstly, the second image selector 34 acquires the total image group G0 and the total output result group DO from the image processor 31 (step S51).

Then, the second image selector 34 causes the display 107 to display, for confirmation, the confirmation images included in the total image group G0 and the second output result group D2 that includes output results obtained from the total image group G0 and the first model group M1 (step S52). That is, 30 output results are displayed for each of the 80 confirmation images.

Then, the user views the display provided in step S52 (step S53). Thereafter, the user selects confirmation images that the user wants to use in the second model selection process S35, and inputs the selected confirmation images to the second image selector 34 via the inputter 106 (step S54).

The second image selector 34 recognizes the confirmation images selected via the inputter 106 as the second image group G2 and transfers, to the second model selector 35, the second image group G2 and the third output result group D3 that includes output results obtained from the second image group G2 and the first model group M1 (step S55). In the present embodiment, the second image group G2 that includes five confirmation images and the third output result group D3 that includes 150 output results obtained from the second image group G2 and the first model group M1 are transferred to the second model selector 35.

When the second image selection process in step S34 has ended, the second model selector 35 selects machine learning models from the first model group M1 (step S35: second model selection process). The second model selector 35 selects a plurality of machine learning models as the second model group M2 from among the machine learning models included in the first model group M1 by using the second image group G2 and the third output result group D3 that includes output results obtained from the second image group G2 and the first model group M1. Then, the second model selector 35 transfers the second model group M2 to the third image selector 36.

In the case of performing the second model selection process S35, as shown in FIG. 10, firstly, the second model selector 35 acquires the second image group G2 and the third output result group D3 that includes the output results obtained from the second image group G2 and the first model group M1, which are used for selection (step S71).

Then, the second model selector 35 causes the display 107 to display, for confirmation, each of the confirmation images included in the second image group G2 and the output results of the first model group M1 for the confirmation image (step S72). That is, 30 output results are displayed for each of the five confirmation images included in the second image group G2.

Then, the user views and checks the display provided in step S72 (step S73). Thereafter, the user selects machine learning models that the user has determined as appropriate, and inputs the selected machine learning models to the second model selector 35 via the inputter 106 (step S74). In the present embodiment, five machine learning models are selected at this time. The second model selector 35 determines machine learning models from the models of the first model group M1 as the second model group M2, based on the contents of the input, and transfers the second model group M2 to the third image selector 36 (step S75).

Note that the first model selection process S33 may be performed manually or automated as described previously. However, not much improvement will be expected in accuracy even if automated selection is carried out repeatedly. It is preferable that the second model selection process S35 and subsequent model selection processes may be performed manually in order to ensure a given degree of quality.

Following the second model selection process S35, the third image selector 36 selects the third image group G3 for use in the third model selection process S37 (step S36: third image selection process). Then, the third image selector 36 transfers the third image group G3 to the third model selector 37. The number of confirmation images included in the third image group G3 is larger than the number of confirmation images included in the second image group G2.

In the third image selection process S36, the third image selector 36 may select a plurality of images as the third image group G3 by using all of the confirmation images included in the total image group G0 and the fourth output result group D4 that includes output results obtained from the total image group G0 and the second model group M2 in the same manner as in the first image selection process S32 and the second image selection process S34.

Alternately, the third image selector 36 may perform the third image selection process S36 by a method different from the method used in the first image selection process S32 and the second image selection process S34. For example, the third image selector 36 may select all of the confirmation images included in the total image group G0 as the third image group G3. As another alternative, the third image selector 36 may select images at random from among the confirmation images included in the total image group G0. In that case, the selected images may include the confirmation images included in the first image group G1 and the confirmation images included in the second image group G2.

The third image selector 36 transfers, to the third model selector 37, the third image group G3, the second model group M2, and the fifth output result group D5 that includes output results obtained from the third image group G3 and the second model group M2. In the present embodiment, the third image group G3 that includes 40 confirmation images and the fifth output result group D5 that includes 200 output results obtained from the third image group G3 and the second model group M2 are transferred to the third model selector 37.

When the third image selection process in step S36 has ended, the third model selector 37 selects a machine learning model from the second model group M2 (step S37: third model selection process). The third model selector 37 selects one machine learning model as the selected model Mf from among the machine learning models included in the second model group M2 by using the third image group G3 and the fifth output result group D5 that includes output results obtained from the third image group G3 and the second model group M2. Then, the third model selector 37 outputs the selected model Mf.

In the case of performing the third model selection process S37, as shown in FIG. 10, firstly, the third model selector 37 acquires the third image group G3 and the fifth output result group D5 that includes the output results obtained from the third image group G3 and the second model group M2, which are used for selection (step S71).

Then, the third model selector 37 displays, for comparison, each of the confirmation image included in the third image group G3 and all of the output results of the second model group M2 for the confirmation image. Then, the user views and checks the display (step S72). This process is performed for all of the confirmation images included in the third image group G3.

The user compares the confirmation images and the output results, selects a machine learning model that is considered as an appropriate output result, and inputs the selected machine learning model to the inputter 106 (step S73). In the present embodiment, one machine learning model is selected at this time. The third model selector 37 determines, as the selected model Mf, the machine learning model selected based on the contents of input from the second model group M2 and outputs the selected model Mf (step S74).

Through the procedure described above, the machine-learning-model selection process S3 selects one machine learning model in three stages including the first model selection process S33, the second model selection process S35, and the third model selection process S37. In each of the model selection processes, the number of confirmation images targeted for confirmation is increased gradually and the number of models targeted for selection is reduced gradually.

That is, firstly, a small number of confirmation images is used to select a large number of machine learning models, and then a larger number of confirmation images is used to further select machine learning models in the subsequent model selection processes. By increasing the number of confirmation images in stages and narrowing down the number of machine learning models in stages, it is possible to accurately select an appropriate machine learning model while minimizing the number of output results of the models that are checked for model selection. Accordingly, it is possible to select a machine learning model from among a large number of machine learning models with high accuracy and efficiency without using Ground Truth.

In particular, in the case where there is a large number of machine learning models targeted for selection, the execution of a three or more step model selection process allows more accurate selection of an appropriate machine learning model than in the case where a machine learning model is selected in two steps.

In the present embodiment, the first model selection process S33 and the second model selection process S35 may be performed according to the judgment of the user who has checked the output results of the machine learning models. This allows appropriate selection of the first model group M1 and the second model group M2.

In the present embodiment, the confirmation images used in each of the model selection processes are selected from among a large number of confirmation images. This allows more accurate selection of a machine learning model.

In the present embodiment, in the case of automating the first image selection process S32, confirmation images to be selected are those that are likely to have variation among the output results of the machine learning models targeted for selection. This allows accurate selection of a machine learning model even if a small number of confirmation images is used for selection.

In the present embodiment, the machine learning models targeted for selection are those that perform image processing for recognizing and segmenting cell regions within images that include cells. This type of machine learning models have greatly varying input images depending on cell type, reagent type, or observation environments. Thus, it is important to select an appropriate machine learning model.

In the present embodiment, a machine learning model is selected using the analysis images targeted for analysis. This allows an optimum machine learning model to be selected for the analysis images.

2. Variations

While one embodiment of the present invention has been described thus far, the present invention is not intended to be limited to the above-described embodiment.

In the above-described embodiment, the model selection process of selecting a machine learning model is performed in three steps including the first model selection process, the second model selection process, and the third model selection process, but the present invention is not limited to this example. Alternatively, a two-step model selection step or a four or more step model selection process may be used to select a machine learning model. The number of steps included in the model selection process may be set freely depending on the number of confirmation images or the number of machine learning models targeted for selection.

In the above-described embodiment, after the first model selection process, the second image selection process is performed by using the first model group selected in the first model selection process. After the second model selection process, the third image selection process is performed by using the second model group selected in the second model selection process. However, the present invention is not limited to this example. The second image selection process and the third image selection process may be performed in parallel with the first image selection process before the first model selection process. In this case, the second image selection process and the third image selection process are performed by using the total model group.

In the above-described embodiment, the confirmation images used in the first model selection process, the second model selection process, and the third model selection process are selected in the first image selection process, the second image selection process, and the third image selection process, respectively. However, the confirmation images may be selected at random without performing these image selection processes. As another alternative, only the first image selection process or only the first and second image selection processes may be performed.

In the above-described embodiment, the machine learning models targeted for selection are those that perform image processing for recognizing and segmenting cell regions within images that include cells. However, the machine learning models targeted for selection in the present invention are not limited thereto. According to the present invention, the machine learning models targeted for selection only need to be machine learning models that perform image processing. For example, the machine learning models targeted for selection may be machine learning models that segment and classify a plurality of cells into multiple labels, machine learning models that identify objects within images, or machine learning models that perform image processing in order to facilitate image observation.

The configurations of the preferred embodiments and variations described above may be appropriately combined as long as there are no mutual inconsistencies.

REFERENCE SIGNS LIST

1 machine-learning-model selection apparatus
22 machine-learning-model selector
32 first image selector
33 first model selector
34 second image selector
35 second model selector
36 third image selector
37 third model selector
G0 total image group
G1 first image group
G2 second image group
G3 third image group
M0 total model group
M1 first model group
M2 second model group
Mf selected model
S3 machine-learning-model selection process
S32 first image selection process
S33 first model selection process
S34 second image selection process
S35 second model selection process
S36 third image selection process
S37 third model selection process

The invention claimed is:

1. A model selection method of selecting at least one machine learning model from among a plurality of machine learning models by using a plurality of confirmation images, the plurality of machine learning models being for performing image processing, the model selection method comprising:

a) a first model selection process of selecting, from among all of the plurality of machine learning models that are included in a total model group, a plurality of machine learning models as a first model group by using a first image group that includes at least one confirmation image among the plurality of confirmation images; and b) a second model selection process of selecting at least one machine learning model as a second model group from among the plurality of machine learning models included in the first model group, by using a second image group that includes a plurality of confirmation images among the plurality of confirmation images, the second model selection process b) being performed after the first model selection process a), wherein the number of the plurality of confirmation images included in the second image group is larger than the number of the at least one confirmation image included in the first image group.

2. The model selection method according to claim 1, wherein the first model selection process a) includes:

a1) obtaining output results by inputting all of the at least one confirmation image included in the first image group to all of the plurality of machine learning models included in the total model group;

a2) displaying the output results obtained in the operation a1); and a3) receiving input of a selection result from an outside source, the selection result being obtained by selecting some of the plurality of machine learning models included in the total model group.

3. The model selection method according to claim 1, wherein the second model selection process b) includes:

b1) obtaining output results by inputting all of the plurality of confirmation images included in the second image group to all of the plurality of machine learning models included in the first model group;

b2) displaying the output results obtained in the operation b1); and b3) receiving input of a selection result from an outside source, the selection result being obtained by selecting some of the plurality of machine learning models included in the first model group.

4. The model selection method according to claim 1, wherein the at least one machine learning model included in the second model group includes a plurality of machine learning models, the model selection method further comprising:

c) a third model selection process of selecting one machine learning model from among the plurality of machine learning models included in the second model group, by using a third image group that includes a plurality of confirmation images among the plurality of confirmation images, the third model selection process c) being performed after the second model selection process b), wherein the number of the plurality of confirmation images included in the third image group is larger than the number of the plurality of confirmation images included in the second image group.

5. The model selection method according to claim 1, further comprising:

d) a first image selection process of selecting one or a plurality of confirmation images as the first image group from among all of the plurality of confirmation images, the first image selection process d) being performed before the first model selection process a); and e) a second image selection process of selecting a plurality of confirmation images as the second image group from among all of the plurality of confirmation images, the second image selection process e) being performed before the second model selection process b).

6. The model selection method according to claim 5, wherein the first image selectin process d) includes:

d1) obtaining output results by inputting all of the plurality of confirmation images to all of the plurality of machine learning models included in the total model group;

d2) calculating variation among the output results obtained in the operation d1) for each of the plurality of confirmation images; and d3) selecting a confirmation image that has great variation calculated in the operation d2) as the first image group from among all of the plurality of confirmation images.

7. The model selection method according to claim 1, wherein the plurality of machine learning models perform image processing for recognizing and segmenting a cell region within an image that includes a cell.

8. An image processing method of performing image processing on a plurality of analysis images by using a machine learning model, the image processing method comprising:

s) selecting one machine learning model by the model selection method according to claim 1; and t) performing image processing on the plurality of analysis images by using the one machine learning model selected in the operation s), wherein the plurality of confirmation images used in the operation s) are the plurality of analysis images that are processed in the operation t).

* * * * *